United States Patent [19]

Babbs

[11] Patent Number: 4,470,632

[45] Date of Patent: Sep. 11, 1984

[54] VEHICLE SEAT MOUNTINGS

[75] Inventor: Frederick W. Babbs, Sherwood, England

[73] Assignee: TI Cox Limited, England

[21] Appl. No.: 324,399

[22] PCT Filed: Mar. 23, 1981

[86] PCT No.: PCT/GB81/00054

§ 371 Date: Nov. 18, 1981

§ 102(e) Date: Nov. 18, 1981

[87] PCT Pub. No.: WO81/02711

PCT Pub. Date: Oct. 1, 1981

[30] Foreign Application Priority Data

Mar. 21, 1980 [GB] United Kingdom ............... 8009548
Oct. 21, 1980 [GB] United Kingdom ............... 8033930

[51] Int. Cl.$^3$ ............................................. B60N 1/02
[52] U.S. Cl. ................................. 297/362; 297/330; 297/346
[58] Field of Search ............ 297/362, 361, 330, 346; 248/429, 430, 393, 394, 395

[56] References Cited

U.S. PATENT DOCUMENTS

| 2,180,505 | 11/1939 | Bradfield, Jr. | 297/362 |
| 2,915,111 | 12/1959 | Homier | 297/362 |
| 2,919,744 | 1/1970 | Tanaka | 297/346 |
| 2,930,428 | 3/1960 | Rose | |
| 2,939,513 | 6/1960 | Leslie et al. | 248/394 |
| 3,039,732 | 6/1962 | Kopitzki | |
| 3,089,676 | 5/1963 | Pickles | 248/394 |
| 3,582,033 | 6/1971 | La Fleche | |
| 3,626,130 | 12/1971 | Siegal | |
| 4,015,812 | 4/1977 | Heesch | |
| 4,264,849 | 4/1981 | Fleischer et al. | 297/330 |

FOREIGN PATENT DOCUMENTS

| 2321184 | 11/1974 | Fed. Rep. of Germany | |
| 2822135 | 11/1979 | Fed. Rep. of Germany | 297/362 |
| 2098852 | 2/1972 | France | |
| 2364138 | 9/1977 | France | |
| 2431390 | 6/1979 | France | |
| 1490796 | 11/1977 | United Kingdom | |
| 1547561 | 6/1979 | United Kingdom | |

Primary Examiner—William E. Lyddane
Assistant Examiner—Mark W. Binder
Attorney, Agent, or Firm—Price, Heneveld, Huizenga & Cooper

[57] ABSTRACT

This invention relates to a vehicle seat slide support system and is particularly concerned with a seat slide arrangement which enables a variety of adjustments to be made to the position of a seat and its configuration within a vehicle. A feature of the invention lies in the provision of an arrangement in which common parts may be used in the manually adjusted and motorized form of the seat support. In one aspect the present invention provides a slide assembly for a vehicle seat comprising a first slide member (26) arranged to support or form part of the seat squab structure co-operating with a further slide member (25) arranged to be mounted on the floor of the vehicle. In an adaptation the further slide member is provided at the front and/or rear ends with mounting means (28) by which it may be mounted on the vehicle floor and adjusted in height relative to the vehicle door. In a further adaptation the first slide member is provided with pivotal mounting means (60) at the rear end arranged to carry a seat back portion in such a fashion that the angle of the back of the seat squab may be adjusted. Preferably an electric motor drive comprises a single electric motor (100) and can be selectively coupled to the various adjustment drive functions by way of electromagnetic clutches (108, 115, 109, 117). Preferably the control of the motor drive and the driven functions is by means of microprocessor. Preferably the microprocessor is provided with means to store details of adjusted positions of the seat, and to move the seat to conform to those stored details in response to a user command.

7 Claims, 18 Drawing Figures

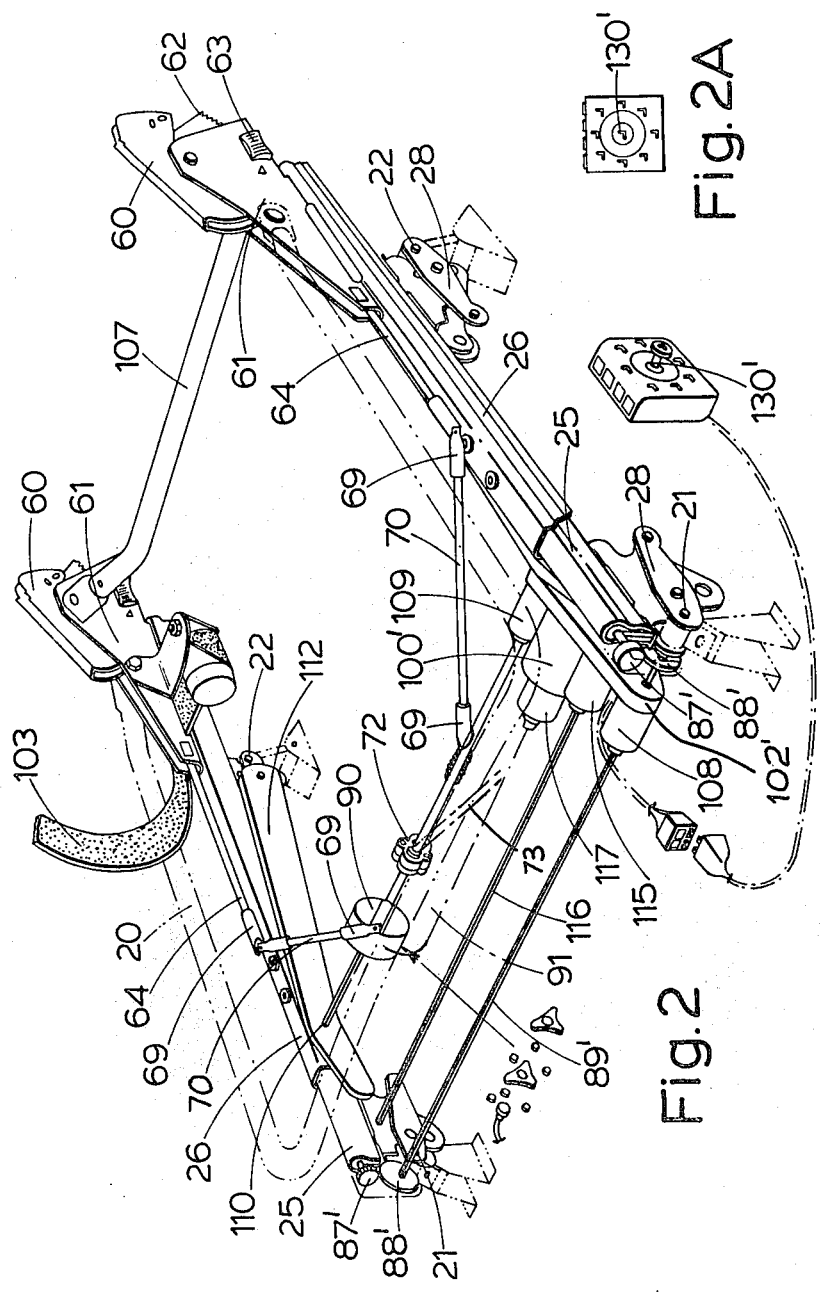

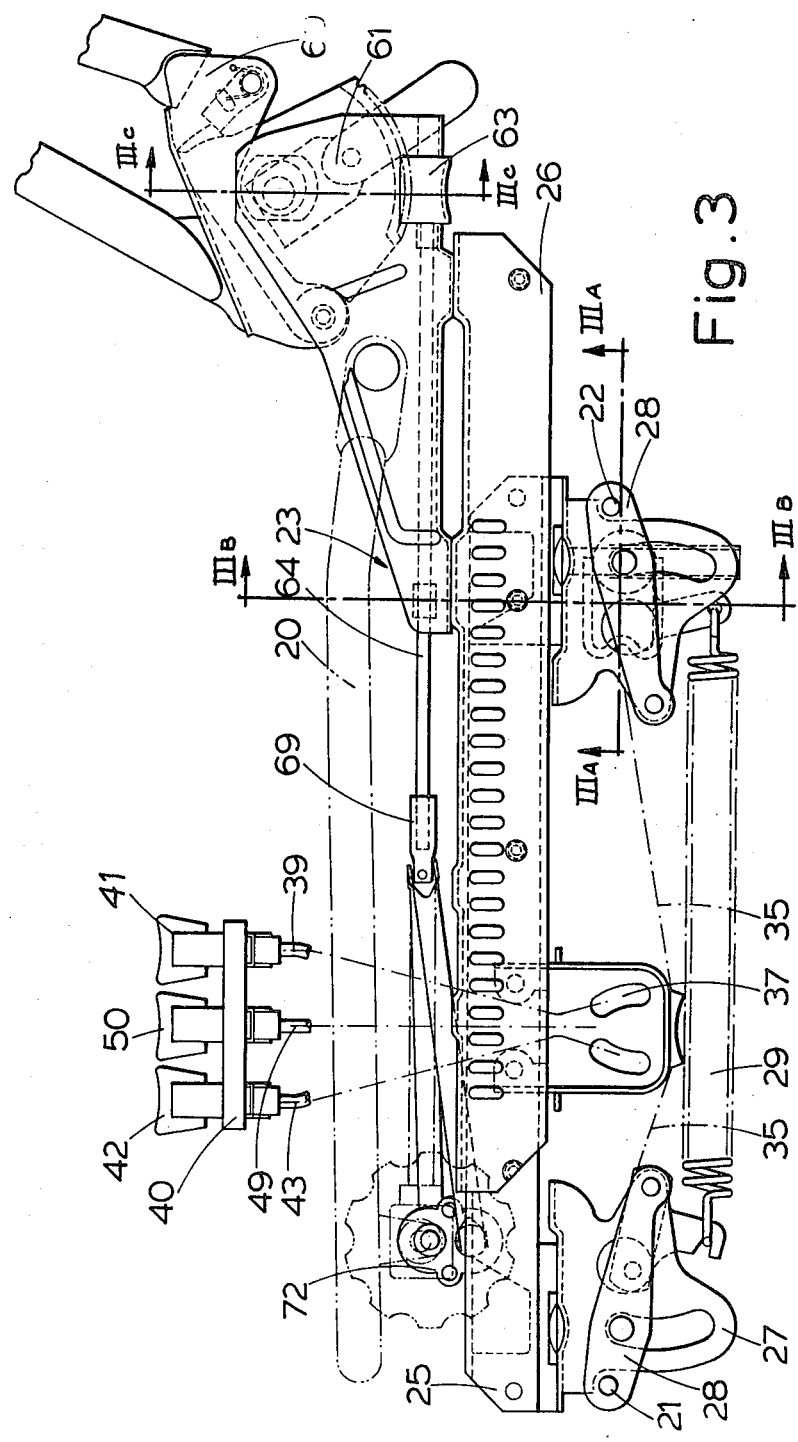

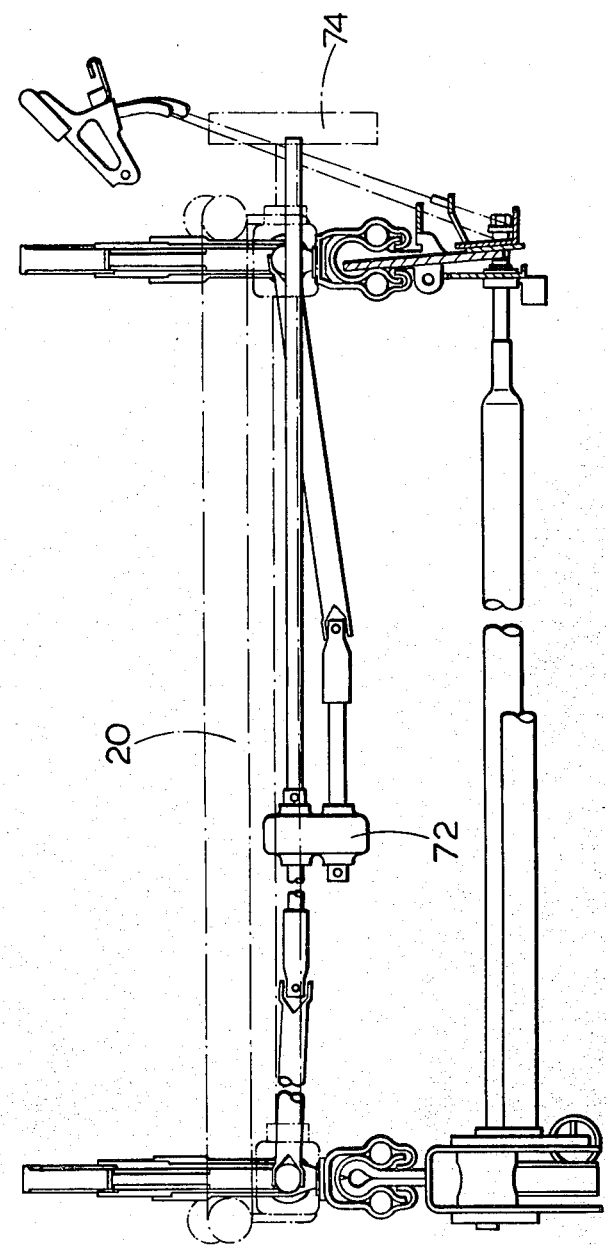

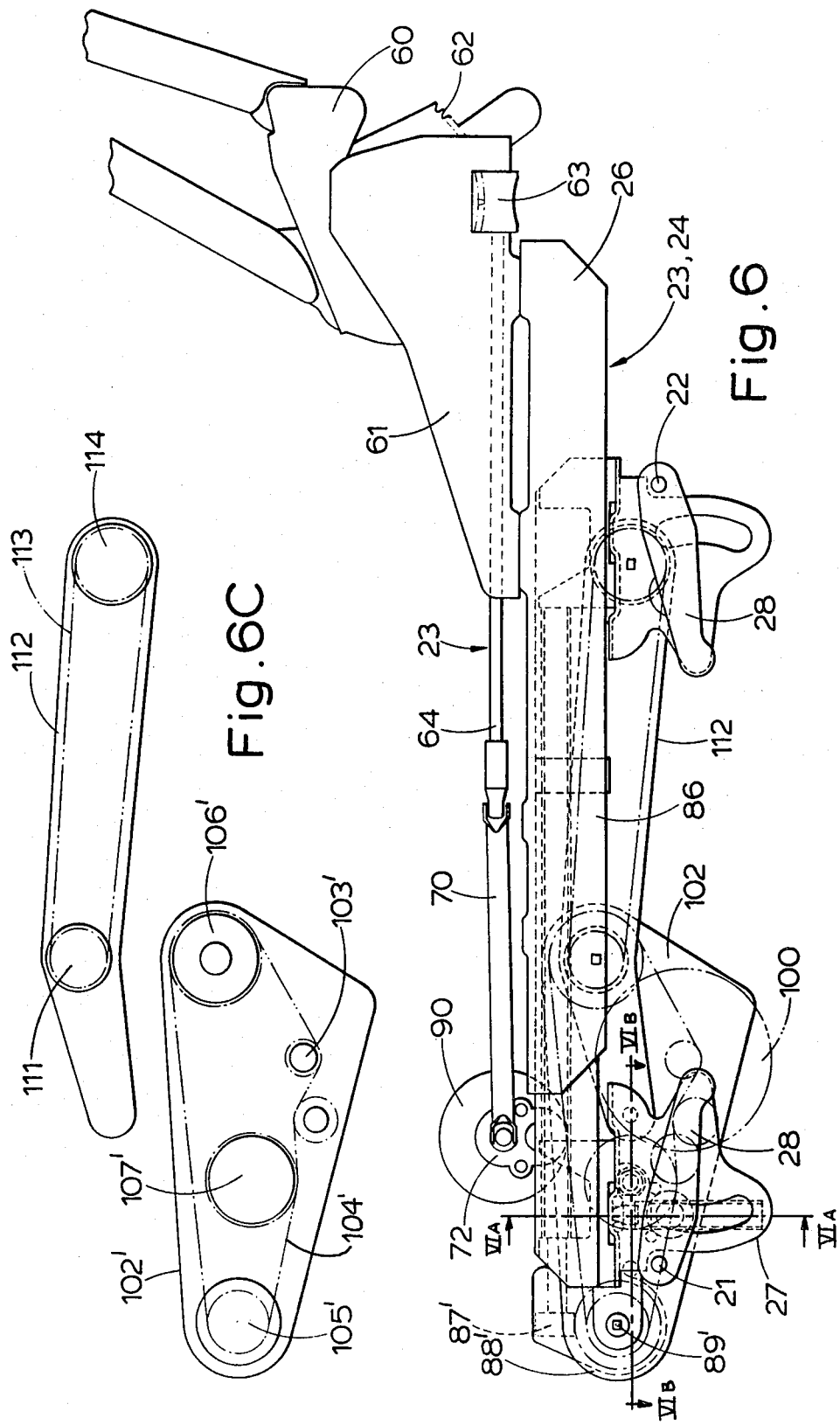

VEHICLE SEAT MOUNTINGS

This invention relates to a vehicle seat slide support system and is particularly concerned with a seat slide arrangement which enables a variety of adjustments to be made to the position of a seat and its configuration within a vehicle.

One object of the invention is to provide a seat slide unit which may be of lightweight construction and which may be used in pairs, one to each side of a vehicle seat. The seat slide arrangement may provide for adjustment of the height of the seat, its fore and aft position, the angle which the seat squab makes with the floor of the vehicle, and for the adjustment of the rake angle of the seat back portion to the seat squab.

It is an object of the invention to provide in such a seat slide mechanism means for the manual adjustment of one or more of such factors and/or means for motorised adjustment of such factors.

It is an object of the invention to provide means whereby the motorised adjustment of such factors may be controlled through the medium of an electronic processor such as a micro-processor in accordance with programmed instructions for the processor in response to control requests from a user. It is a further object to provide means for pre-storing data relating to a particular seat position and configuration so that the microprocessor may move the seat to such position and configuration on demand by the user.

A feature of the invention lies in the provision of an arrangement in which common parts may be used in the manually adjusted and the motorised form of the seat.

Accordingly in one aspect the present invention provides a slide assembly for a vehicle seat comprising a first slide member arranged to support or form part of the seat squab structure, co-operating with a further slide member arranged to be mounted on the floor of the vehicle.

The arrangement is such that the first slide member may slide or move over the second slide member to achieve fore and aft adjustment of the vehicle seat.

In an adaptation the further slide member is provided at the front and/or rear ends with mounting means by which it may be mounted on the vehicle floor and adjusted in height relative to the vehicle floor.

In a further adaptation the first slide member is provided with pivotal mounting means at the rear end arranged to carry a seat back portion in such a fashion that the angle of the back of the seat squab may be adjusted.

In such an arrangement the slide assembly is therefore adapted for manual adjustment of the fore and aft direction, to height of the seat at either or both ends of the slide assembly and of the angle of the back portion.

In a further arrangement the same basic components are arranged for an electric motor drive to make those adjustments. Preferably such electric motor drive comprises a single electric motor and can be selectively coupled to the various adjustment drive functions by way of an electromagnetic clutch. Preferably the control of the motor drive and the driven functions is by means of a microprocessor. Preferably the microprocessor is provided with means to store details of adjusted positions of the seat, and to move the seat to conform to those stored details in response to a user command.

Preferably the slide assembly is arranged so that identical assemblies can be utilised on either side of a vehicle seat, in a pair, with suitable spacing members between the two to form a cohesive structure.

By this means it is possible to provide in effect a series of basic components from which various degrees of sophistication can be built into a vehicle seat support slide arrangement; starting from providing only a fore and after adjustment, progressively adding capabilities such as adjustment of the height of the front and rear end singularly or together; adjustment of the seat back angle, motorised adjustment of such features, and then finally the motorised adjustment of such features under the control of a microprocessor.

In a preferred embodiment the invention provides a slide mechanism for a vehicle seat comprising an outer slide member of generally "U" shaped cross-section, an inner slide member of generally "U" shaped cross-section nesting in the outer slide member, both arms of both cross-sections being formed with grooves in opposing relationship so as to form tracks for bearing balls interposed between the slide members so that the outer slide member may be rolled over the inner slide member.

Preferably the arms of the cross-section of the outer slide member are folded inwards around the outer ends of the arms of the cross-section of the inner slide member to prevent transverse separation of the slide members in the event of the bearing balls being overloaded.

Preferably the slide member cross-sections are so dimensioned that the bearing balls are resiliently pre-loaded when the slide mechanism is assembled.

Preferably the cross-sections of the inner and outer slide members are such that in their unloaded state there is no contact between them except through the intermediary of the bearing balls.

Preferably at least one of the slide members is provided with a series of longitudinally spaced slots or notches which may be selectively engaged by a retractable locking dog associated with the other slide member so as to lock the slide members into a chosen one of a number of relative longitudinal positions.

Preferably the cross-section of the inner slide member includes a part circular portion arranged so that it may encompass a lead screw or drive shaft arranged to co-operate with the outer slide member to move it over the inner slide member.

Preferably the inner slide member is provided at one or both ends with means for mounting it on a vehicle floor structure.

Preferably said mounting means is arranged to adjust the height of the respective end of the slide mechanism relative to the floor.

Preferably each said mounting means comprises a bracket member extending downwardly from the respective end of the inner slide member, a link pivotally mounted on the bracket member at one end arranged to be pivotally mounted on the vehicle floor at the other end, and means for adjusting the angular position of the link relative to the bracket member.

Preferably said angular adjusting means comprises a screw threaded bolt mounted at one end in said bracket member and passing through a trunnion member pivotally carried in said link, said trunnion member being provided with releaseable means arranged to engage the screw threads of said bolt to prevent movement of said trunnion member over said bolt thus retaining a given adjusted height of the slide member.

Preferably said releasable means comprises a plunger slideably mounted in said trunnion member and having a screw threaded end portion arranged to engage the threads of said bolt, and means for resiliently biasing said plunger into said engagement.

Preferably said releasable means comprises two such plungers arranged to engage adjacent portions of the circumference of said bolt.

Preferably said plungers engage over slightly more than half the circumference of said bolt.

Preferably trigger means is provided connected to said plunger or plungers by means of a Bowden cable, to selectively retract said plungers to allow adjustment of the height of the slide mechanism.

Preferably identical height adjustment mechanism is provided at each end of the inner slide member.

Preferably the pivotal links of said identical height adjustment means extend outwardly from the slide member at each end.

Preferably said pivotal links are interconnected by spring means arranged to bias the seat slide member upwards away from the floor.

Preferably said outer slide member is provided at one end with a support bracket for the pivotal mounting of a seat back support quadrant.

Preferably a worm gear mounted is provided rotation in said bracket in engagement with teeth formed on said quadrant, so that rotation of the worm gear may cause adjustment of the seat back angle.

Preferably said worm gear is an enveloping worm gear.

Preferably said outer slide member is provided with means for anchoring a seat belt.

Preferably a slot is formed between said support bracket and said outer slide member, through which such seat belt may pass from the anchoring means over an occupant of a seat supported by the slide mechanism.

Preferably mechanism as claimed in any one of said screw threaded bolt is rotatably mounted at said one end in said bracket member so that rotation of the bolt adjusts the height of the slide member.

Preferably a worm wheel is drivably attached to said screw threaded bolt and arranged in mesh with a worm gear mounted for rotation in said bracket about an axis transverse to the slide members.

Preferably said screw threaded bolt is mounted in a ball bearing thrust race at its upper end, with its lower end passing through said trunnion member.

Preferably a trigger mechanism is provided connecting to said locking dog by means of a bowden cable arrangement, said trigger means being mounted on said outer slide member.

Preferably a further trigger means is provided connected to each said plunger by means of a bowden cable arrangement, said further trigger means being mounted on said outer slide member.

Preferably lead screw is rotatably mounted within the cross section of said inner slide member and axially located relative thereto, and a lead screw nut attached to said outer slide member in screw threaded engagement with the lead screw so that rotation of the lead screw drives the outer member along the inner member.

An embodiment of the invention also provides an assembly comprising a pair of such slide mechanisms arranged one on each side of a vehicle seat.

Preferably the worm gears of the two front height adjustment mechanisms are coupled by a common cross-shaft which may be drivably connected to an electric motor.

Preferably the worm gears of the rear height adjustment mechanism of each slide are coupled by means of a belt respective drive to a cross-shaft which may be drivably connected to an electric motor.

Preferably the lead screws of the slide mechanisms are drivably connected by means of skew gears to a common cross-shaft which may be drivably connected to an electric motor.

Preferably the quadrant worm gears of the slide mechanisms are connected to a common cross-shaft by means of universal joints of respective cardan shafts, and the common cross-shaft may be drivably connected to a handle and/or an electric motor.

Preferably said cross-shafts are drivably connected to a single electric motor, each through the intermediary of a respective electro-magnetic clutch device.

Preferably each electro-magnetic clutch device is arranged to give an electrical pulse signal representative of the movement of the adjustment controlled by that clutch device.

Preferably said electric motor or electric motors and/or said electro-magnetic clutch devices are controlled by means of a micro-processor.

Preferably said micro-processor is provided with means for storing signals representative of an adjustment position of the various movements of the assembly, and means to provide signals to the electric motors and/or clutches to drive the assembly to that prestored adjustment position.

In order to promote a fuller understanding of the above and other aspects of the invention some embodiments will now be described by way of example only with reference to the accompanying drawings in which:

FIG. 2 is an exploded view of an electrically operated embodiment of the invention;

FIG. 3 is a side elevation of the embodiment of FIG. 1;

FIG. 6 is a side view of the embodiment of FIG. 2;

FIG. 6C shows two views of the belt drive units for the electrically operated embodiment of this invention;

FIG. 1 shows an exploded view of a vehicle seat slide support arrangement. The outline frame of a vehicle seat is shown at 20 and it is supported by the slide support arrangement from pivot points 21 at the front of the seat and pivot points 22 at the rear of the seat, the pivot points being provided on pillars forming part of or being attached to the floor structure of the vehicle.

Figure 1:
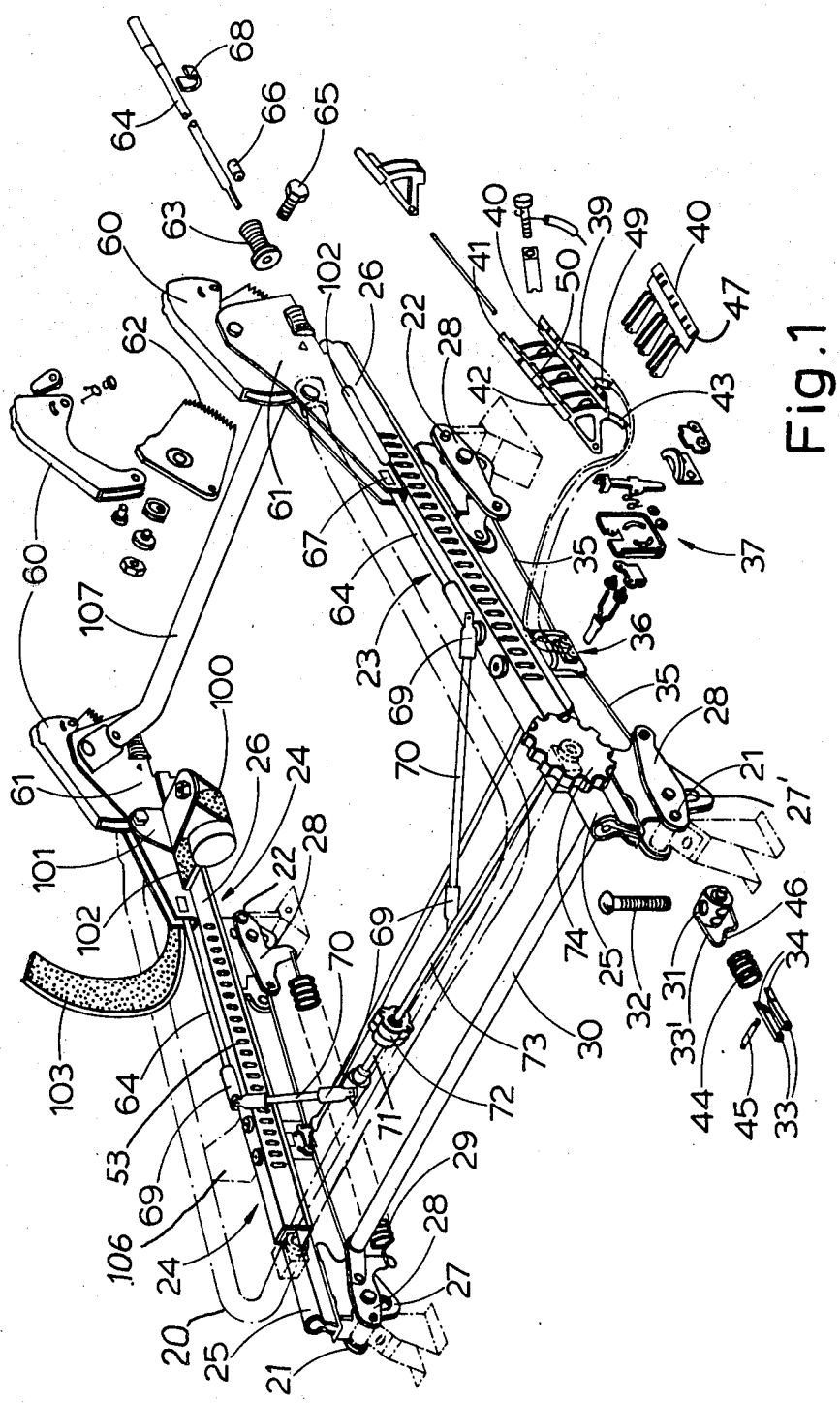
FIG. 1 is an exploded view of a manually operated embodiment of the invention.
Figure 3A:
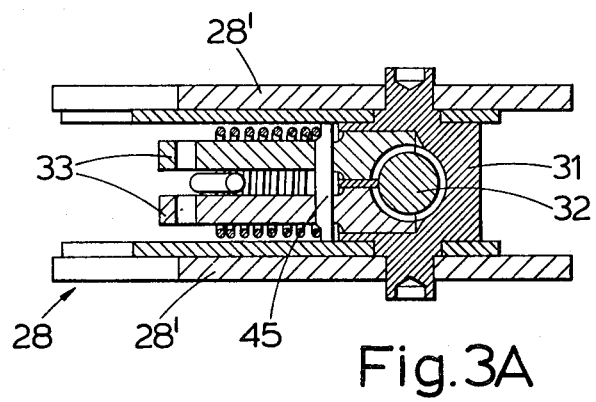
FIG. 3A is a cross-section on the line IIIA—IIIA of FIG. 3.
Figure 3B:
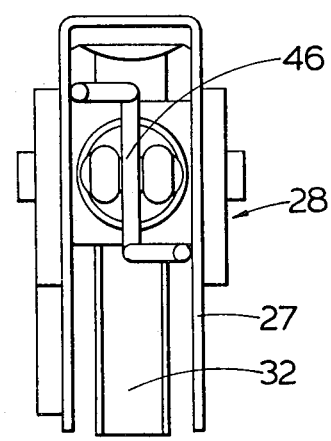
FIG. 3B is a cross-section on the line IIIB—IIIB of FIG. 3.
Figure 3C:
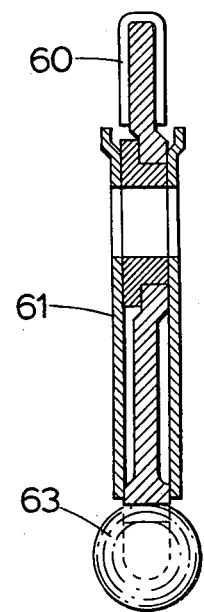
FIG. 3C is a cross-section on the line IIIC—IIIC in FIG. 3.
Figure 4:
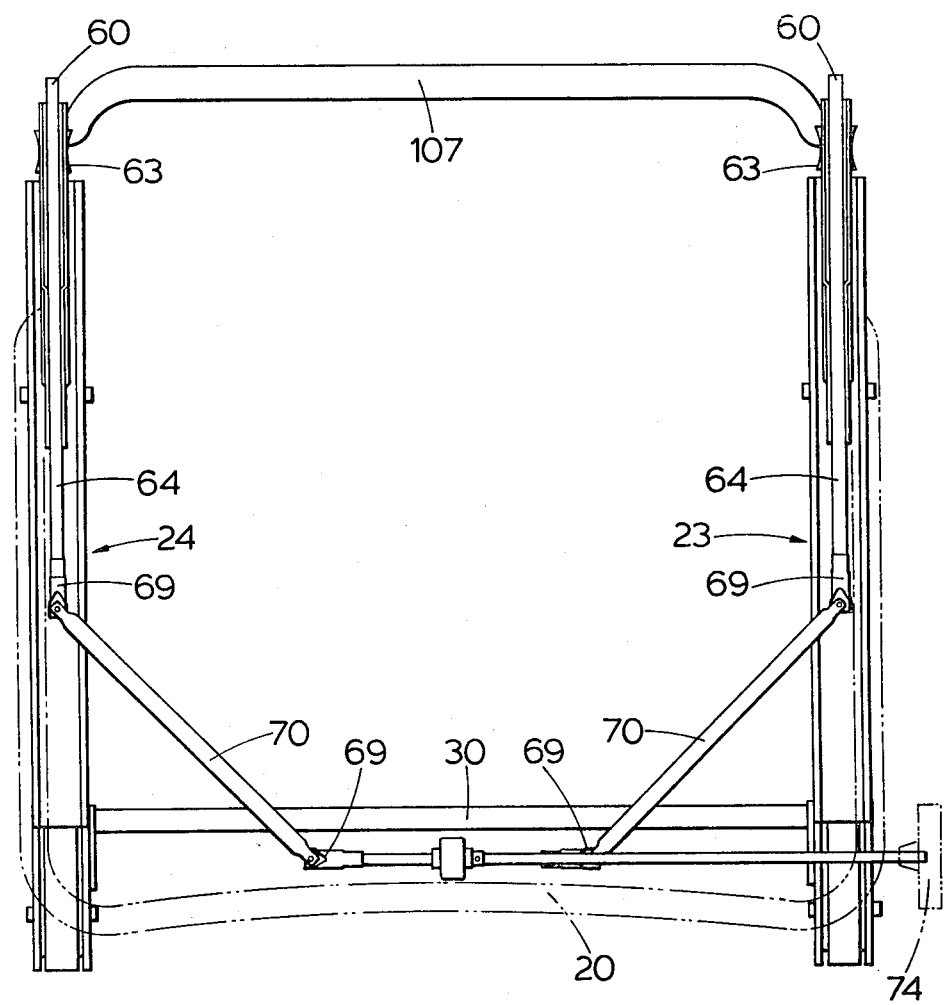
FIG. 4 is a plan view of the embodiment of FIG. 1.
Figure 5A:
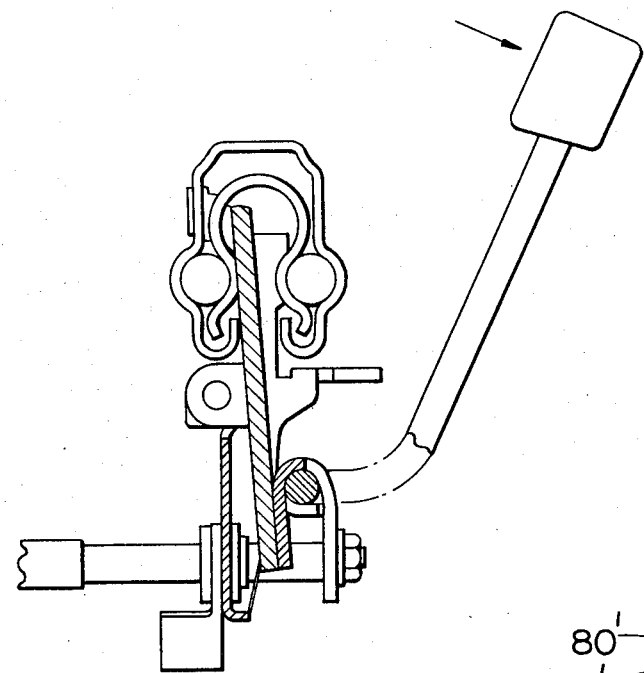
FIG. 5 is a front view of the embodiment of FIG. 1.

The seat slide arrangement comprises two seat slide assemblies arranged one on either side of the vehicle seat indicated at 23 and 24. The slide assemblies 23 and 24 each comprise co-operating slide members one of which indicated at 25 is supported in a manner to be described from the pivot points 21 and 22 and the other of which indicated at 26 supports the seat frame 20. The arrangement is such that the slide members 26 move in a fore and aft direction on the slide members 25 to allow fore and aft adjustment of the seat in the vehicle.

On the underside of the slide members 25 identical front and rear support brackets 27 are provided; and these support brackets are connected to the pivot points 21 and 22 respectively by pivotal links 28, so that the front or rear of the seat can be raised or lowered by pivotting of the links 28 either independently or in synchronism, thus achieving adjustment of the height of the seat or of the rake angle of the seat.

In order to assist raising of the seat a tension spring 29 is provided acting between arms 30 provided on the links 28 which both extend outwardly from the brackets, and are arranged to bias the seat in an upward direction.

The arrangement of brackets 27, links 28 and bias springs 29 is the same on each side of the seat. In order to synchronise the two sides of the seat, the link 28 may be coupled by a torsion member such as that shown at 30'.

The pivotal links 28 are each in the form of a pair of link plates 28' extending one on either side of the respective bracket 27. A trunnion member 31 is pivotted in the link plates 28' and is positioned inside the bracket 27 which is of downward facing 'U' shaped cross section, there being slots 27$^1$ for the pivots of the trunnion 31. A screw threaded bolt 32, which in the embodiment of FIG. 1 is rigidly attached at its upper end to the bracket 27, passes through a bore in the trunnion 31. The trunnion 31 is provided with two slideable plungers 33 the ends of which are formed with screw threaded portions 34, arranged to engage the threads of the bolt 32. The arrangement is such that the screw threaded portions 34 engage over approximately a quarter of the circumference of the bolt 32, the portion of engagement extending slightly "over centre" around more than half the circumference, so that the plungers 33 are retained in engagement with the bolt 32. When the plungers are so engaged, the bolt 32 is axially located in the trunnion 31 so that movement of the link 28 relative to the bracket 27 is prevented, and thus the height of the appropriate corner of the seat is supported against any load on it. The plungers 33 are resiliently biased into the bolt 32 by means of a spring 44 which acts between the pin 45 which passes through the plungers 33 and a wire bracket 46 rigidly attached to the trunnion 31. In order to allow adjustment the plungers 33 are retracted clear of the bolt 32, the force of retraction being sufficient to overcome "the over centre engagement" and springs 44 thus allowing the bolt 32 to pass freely through the trunnion 31 so that the respective corner of the seat may be adjusted in height.

The plungers are connected to pull wires 35 which in turn are connected at 36 to a mechanism 37 attached to the underside of the slide member 25. It will be appreciated that this arrangement is provided on each side of the seats, and in order to operate the mechanism 37 a Bowden cable arrangement is provided to connect the mechanisms to operating triggers. A Bowden cable 39 is associated at one end with the front right hand pull wire 35. The core of the Bowden cable 39 is attached at the other end to a bracket indicated generally at 40 carried on the seat structure. The sleeve of the cable 39 is attached to a trigger 41 which is pivotally mounted on the bracket 40 so that pivoting of the trigger 41 operates the two front pull wires 35 to release the vertical adjustment at the front of the seat. Similarly a trigger 42 is arranged to operate the rear pull wires 35 by means of a Bowden cable 43. Thus the trigger 42 can release the rear of the seat for vertical adjustment. Action of the triggers 41 and 42 overcomes the force of the respective springs 44 and retraction of plungers 33. In order to assist a user in overcoming this spring force the bracket 40 includes a pressure pad 47 so that the user may squeeze a trigger against the pressure pad 47.

The fore and aft movement of the slide member 26 over the respective slide member 25 is controlled by means of a ratchet dog member which is pivotally mounted on the slide member 25 to pass through a slot or aperture formed in the slide member 25 to engage a selected one of a series of notches formed in the slide member 26, in known manner per se. The ratchet members on the two sides are operated by means of a Bowden cable 49 and a trigger 50 in a similar manner to that described for the operation of the height adjustment.

The frame 20 referred to above provides support for the squab portion of the vehicle seat. The seat back portion is attached to mounting quadrants 60 which are pivotally mounted on support brackets 61 which are in turn attached to the rear part of respective slide members 26. The seat back is preferably releaseably attached to the quadrants 60 in a manner described and claimed in our British Patent Specification No. 1,547,561.

The quadrants 60 each include an arcuate portion 62 which is engaged by a hyperboloidal enveloping worm gear 63 carried on a shaft 64 which is rotatably mounted in the respective bracket 61. The brackets 61 are folded from sheet material to have a generally "U" shaped cross-section with the quadrant member 60 pivotally mounted about a pin 65 between the arms of the cross-section. The shaft 64 is carried towards the front of the bracket 61 by means of a bearing bush 66 located at the bottom of the fold between the arms of the bracket 61 by means of recesses indicated at 67 formed in the material of the bracket. The shaft 64 is supported at the rear end of the bracket 61 against separating loads on the worm gear 63, by means of a "U" shaped bearing member 68 which rests in the bottom of the fold between the arms of the bracket 61.

Thus it can be seen that rotation of the shaft 64 to drive the worm gear 63, will bring about angular movement of the quadrant member 60 to adjust the angle of the seat back to the seat squab portion. The shafts 64 are coupled by means of universal joints 69 and cardan shafts 70 to a cross shaft 71. The cross shaft 71 passes through a gear box 72 in which it is coupled, by means of a pair of spur gears, to a drive shaft 73 extending to the side of the seat where it is connected to a handle 74. Thus rotation of handle 74 by the user of the seat can adjust the angle of the seat back.

Figure 10:
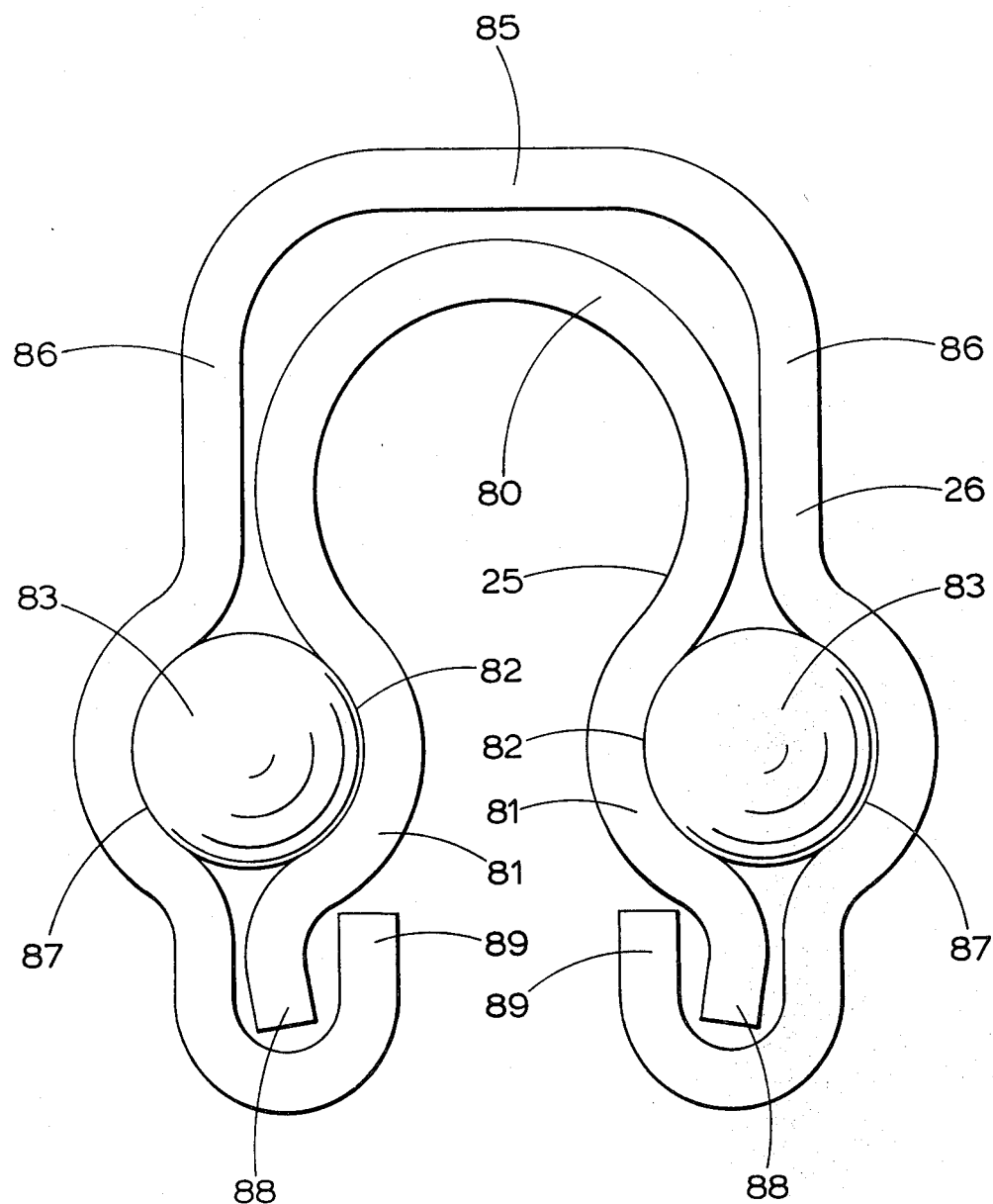
FIG. 10 is a cross-sectional view of the seat slide members of FIGS. 1 and 2.

The arrangement of the seat slide members 26 and 25 is shown in more detail in FIG. 10 which shows a cross-sectional view of the members. The slide member 25 is of generally "U" shaped cross-section having a part circular upper part indicated at 80 with downward extending arms 81. The arms 81 curve in concave fashion as indicated at 82 to form tracks for ball bearings 83. The slide member 26 is also of generally "U" shaped cross section having an upper part 85 with downwardly extending arms 86 which are also formed with concave parts 87 to form tracks for the ball bearings 83. A series of ball bearings 83 are interposed between the slide members 25 and 26 so that the slide member 26 may roll fore and aft on the ball bearings over the slide member 25. The arms of the slide members are manufactured to such dimensions that the ball bearings are pre-loaded. This pre-loading provides for compensation in manufacturing tolerances and wear of the tracks in use while preventing free movement between the slide members in a transverse direction when the seat is unoccupied, thus preventing the seat from rattling in such condition.

The ratchet dog member is preferably arranged inside the slide member 25 and provided with dogs 48' which pass through slots in the slide member 25 to engage in a selected pair of slots 53 extending in a series along the slide member 26. The ratchet dog member is preferably pivotally mounted on a bracket carried by the slide member 25.

The lower part of the arms 81 of the slide member 25 terminate in downward extending portions 88, whereas the lower parts of the arms 86 of the slide member 26 are curved inwards and upwards to overlie the portions 88, as indicated at 89. By this means the separation of slide member 26 from the slide member 25 in a transverse direction is resisted in the event of the load capacity of the ball bearing arrangement being exceeded, for instance by the shock loading of the slide in the event of an accident. Such resistance to shock loading is sufficient to provide a safe anchorage for a seat belt for the occupant on the slide member 26.

A typical arrangement of such seat belt anchorage is shown in FIGS. 1 and 2 where an inertia brake seat belt reel 100 is shown mounted by means of a bracket 101 on the slide member 26 through the intermediary of bracket 61. A slot 102 is provided between the respective bracket 61 and seat slide member 26, for the seat belt 103 to pass freely through and over the occupant of the seat from either side. An inertia reel assembly may be provided on either side of the seat, or if desired on one side of the seat a simple seat belt anchorage may be provided.

The slide member 25 is supported on and attached to the brackets 27 by means of members which extend from the top of the brackets 27 to engage in the interior profile of the slide arm 25. The seat frame 20 is in this embodiment mounted on the rear part of the bracket 61 and supported towards the front by means of brackets 106 on the upper part of the slide member 26. The torsion member 30' between the front links 28 serves to space the slide members 25 at the front, while a spacer tube 107 may be provided between the brackets 61 to space the slide members 26 at the rear providing a cohesive structure.

Thus it can be seen that the assembly described provides a support arrangement for a vehicle seat, mounted on the vehicle floor; which provides for fore and aft adjustment of the seat on operation of the trigger 50, provides for adjustment of the height of the front of the seat on operation of trigger 41; provides for adjustment of the height of the rear of the seat independently or simultaneously with the front of the seat, on operation of the trigger 42, without or with the trigger 41; and provides for adjustment of the angle of the seat back on rotation of the handle 74. The operation of the springs 29 is such that to raise the seat, the occupant lifts his weight from the seat so that on operation of the appropriate trigger the occupant can raise and/or alter the rake angle of the seat beneath him. To lower the seat the occupant uses part of his weight on operation of the appropriate trigger to move the appropriate part of the seat down against the action of the springs 29.

FIG. 2 shows an exploded view of a seat support arrangement similar to that of FIG. 1 except in the arrangement for electric motor operation of the various seat position adjustments. Most of the components in the arrangement of FIG. 2 are identical with those shown in FIG. 1 and no further description will therefore be given to those components and the same reference numbers are used for them.

Figure 6A:
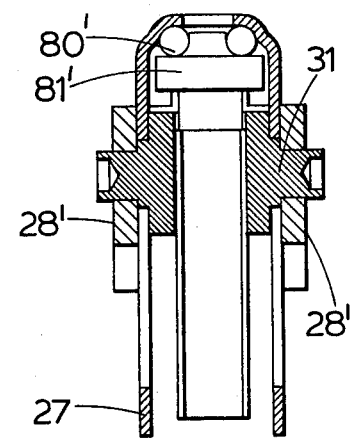
FIG. 6A is a cross-section on the line VIA—VIA of FIG. 6.
Figure 6B:
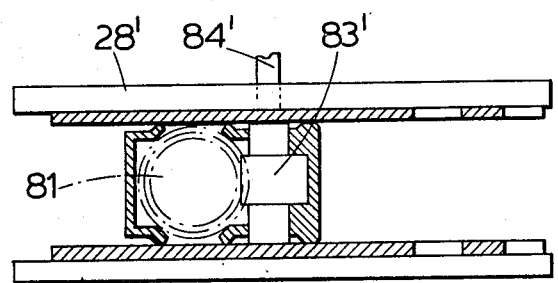
FIG. 6B is a cross-section on the line VIB—VIB of FIG. 6.
Figure 7:
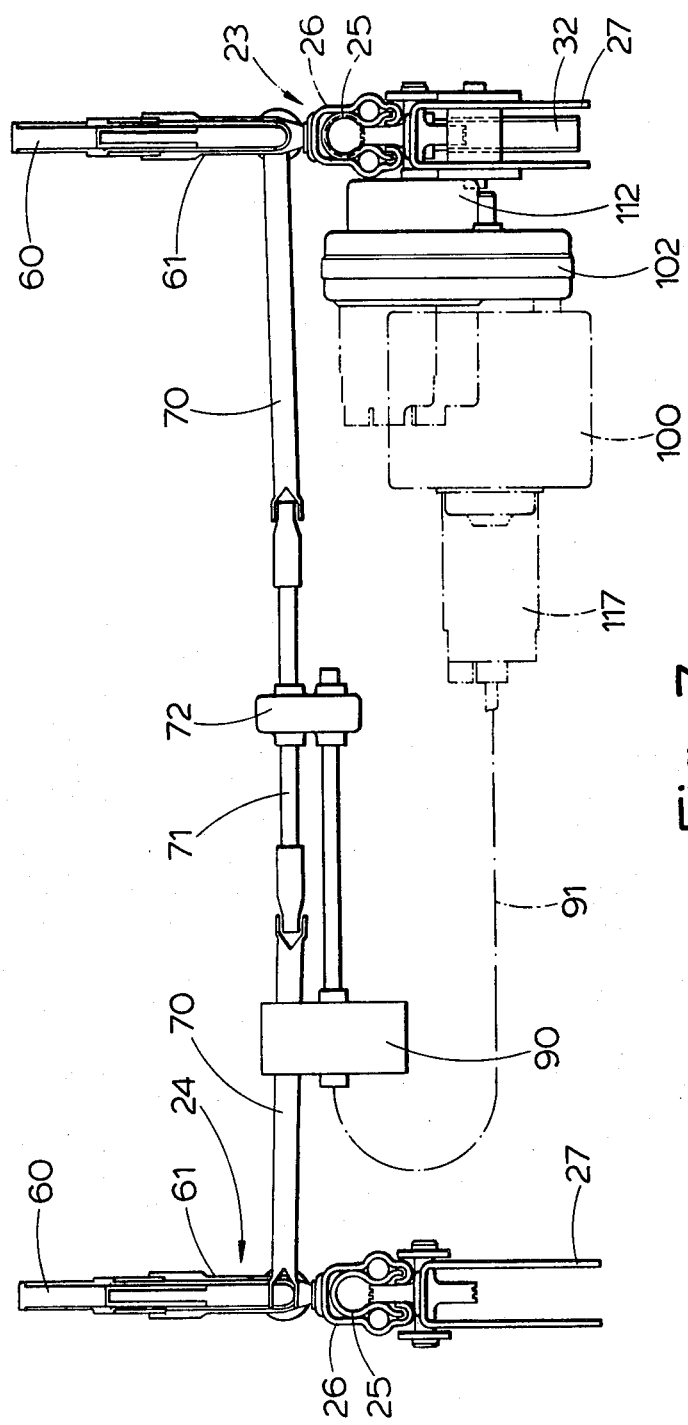
FIG. 7 is a front view of the embodiment of FIG. 2.

In the arrangement of FIG. 2, the height adjusting bolts are rotatably mounted in the brackets 27 by means of a ball bearing thrust arrangement 80' (FIG. 6A). The upper part of the bolt is provided with a worm wheel 81' which may be driven by means of a worm gear 83' (FIG. 6B) carried on a shaft 84' and rotatably mounted in the bracket 27. The trunnion in this arrangement may be screw threaded to take the bolt, or the plunger arrangement of the embodiment of FIG. 1 may be retained, so that in either event rotation of the shaft 84' achieves vertical adjustment of the appropriate corner of the seat. If the plunger arrangement is retained manual adjustment of the height of the seat in the manner described above is also retained.

Fore and aft adjustment of each slide member 26 over the associated slide member 25, is achieved by means of a lead screw which is rotatably mounted in the part circular portion of the cross-section of the slide member 25. A nut member engaging around the lead screw extends downwards between the arms of the cross-section of the slide member 25, and is rigidly attached to the arms of the cross-section of the slide member 26 so that rotation of the lead screw will produce fore and aft adjustment to the slide member 26 over the slide member 25. It will be appreciated that if the lead screw is held even lightly against rotation, a particular fore and aft adjustment position will be maintained against any loads encountered by the seat in use.

At the front end of the lead screw a skew gear 87' is provided in mesh with a skew gear 88' carried on a cross-shaft 89' rotatably mounted on the front of the slide member 25. Thus it can be seen that rotation of the shaft 89' will cause fore and aft adjustment.

In the arrangement of FIG. 2, the drive shaft 73 which is shown broken in FIG. 2, is provided with a handle (not shown) for manual operation if required, and is extended through the gear box 72 on the opposite side to the handle, with an extension shaft coupled to a gear box 90. The gear box 90 is epi-cyclic reduction gear box with an input drive to it by means of a flexible core and sleeve cable drive indicated at 91. Thus rotation of the flexible drive 91 will drive the cardan shafts 70 to adjust the angle of the seat back portion as discussed above. In the alternative, rotation of the shaft 73 by means of the handle (not shown) can make the same adjustment manually.

An electric motor 100' is mounted on a first transmission housing 102' carried on the front end of the left hand slide member 25. The motor 100' is provided on its output shaft with a toothed drive wheel 103' within the housing 102' (FIG. 6C), which by means of a continuous toothed belt 104' is arranged to drive three toothed wheels 105', 106' and 107' also within the transmission housing 102'. The wheel 105' is coupled through the intermediary of an electromagnetic clutch 108 to the cross-shaft 89' to drive the skew gear 88' of the left hand slide member, and as the shaft 89' extends as a drive shaft across the arrangement, to drive the skew gear 88' of the right hand slide member. thus if the motor 100' is energized and the clutch 108 engaged the seat will be moved fore and aft according to the direction of energization of the motor 100'.

The toothed wheel 106' is coupled by way of an electromagnetic clutch 109 to a cross shaft 110 which on either side of the arrangement is coupled to a toothed wheel 111 (FIG. 6C) in respective second transmission housings 112 carried on the respective slide members 25. The toothed wheels 111 are coupled by means of continuous toothed belts 113 to respective toothed wheels 114 at the back of the slide members 25. The toothed wheels 114 are arranged to drive the shafts 84' of the rear height adjustment mechanisms of the slide members. Thus operation of the clutch 109 when the motor 100' is energized will raise or lower the rear of the seat in accordance with the direction which the motor 100' is energized. It should be noted that the toothed belts 113 in this embodiment are interchangeable with the toothed belt 104'.

The toothed wheel 107' in the transmission housing 102' is coupled by way of an electromagnetic clutch 115 to a cross shaft 116 which is coupled to or forms part of the drive shafts 84' of the front height adjustment devices. Thus engagement of the clutch 115 with energizing of the motor 100' will adjust the height of the front of the seat in accordance with the direction of energization of motor 100'.

The Bowden cable drive 91 is connected by way of an electromagnetic clutch 117 to the back of the drive shaft of the motor 100'. Thus on operation of the clutch 117 and energization of the motor 100' the angle of the seat back can be adjusted in accordance with the direction of energization of the motor 100'.

Figure 8:
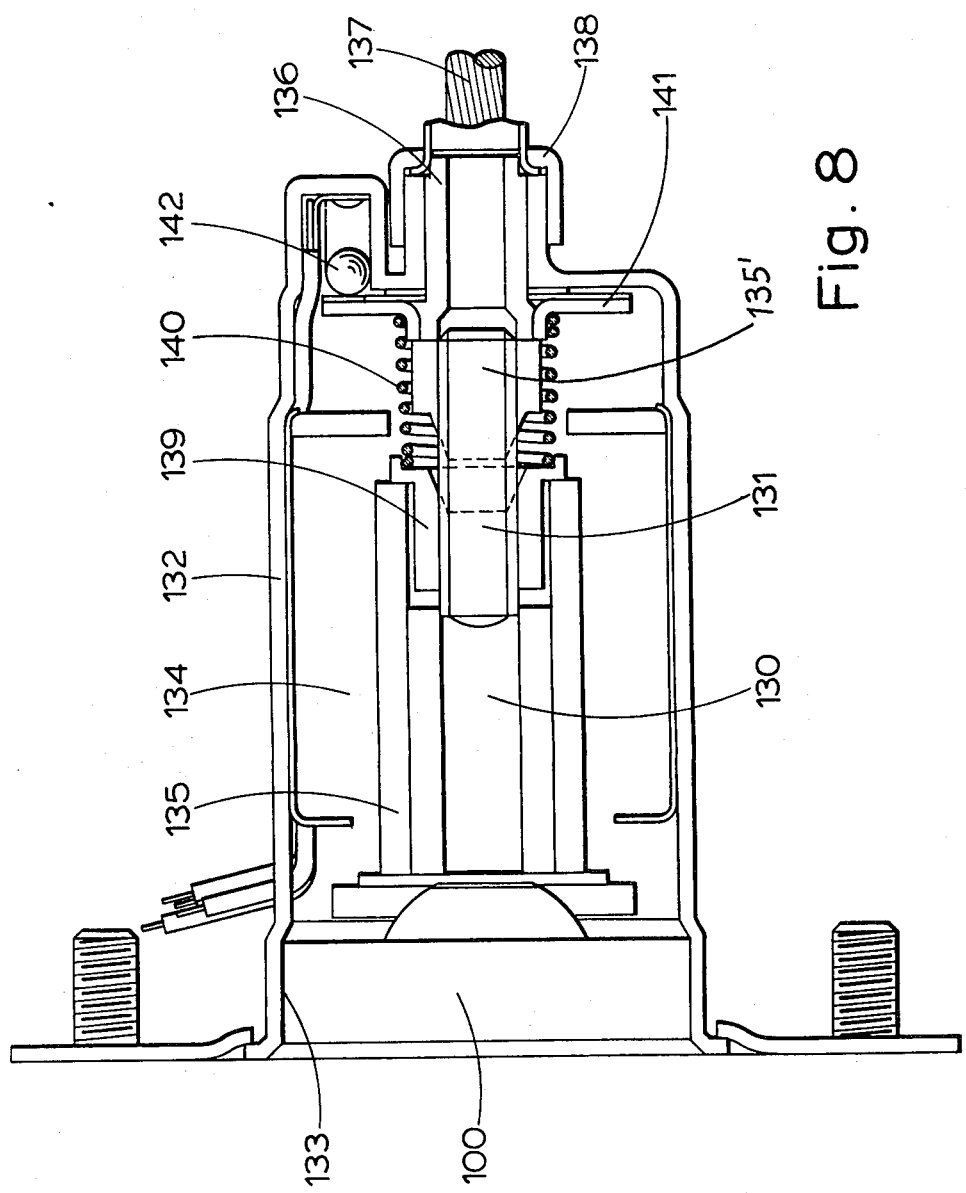
FIG. 8 is a cross-sectional view of a drive clutch of FIG. 2.

FIG. 8 shows a schematic cross-section of the clutch 117 of FIG. 2, in some detail. The motor 100' is provided with an output shaft 130 the free end of which is formed with opposed flats 131. A clutch housing 132 is mounted on the rear of the motor 100' being centered about the shaft 130 by a spigot 133 formed on the motor housing. The housing 132 contains an electromagnetic solenoid 134 which is arranged with an armature sleeve 135 to be axially movable in the solenoid. The output shaft 136 is rotatably mounted in the housing 132 at the end remote from the motor 100', and arranged to be coupled to the core 137 of the flexible drive 91, the sleeve of which is attached to the housing by means of a screw threaded nut 138. The flexible drive 91 may for instance be of the type used for speedometer drives in motor vehicles. The inner end of the drive shaft 135' is formed with dogs arranged to engage with corresponding dogs on a drive member 139 which is slidably mounted on the motor shaft 130 and driveably coupled thereto by means of the flats 131. The armature sleeve 135 is arranged to abut the drive member 139 so that on energising of the solenoid 134 it moves the drive member 139 into engagement with the output shaft to couple the drive from the motor to the flexible drive 91. A coil spring 140 is provided to be operative between the output shaft 136 and the drive member 139 to separate the two positively, when the solenoid is deenergised.

The output shaft 135' is provided with a disc member 141 which is in the form of a sheet metal disc faced, except over a small portion of its periphery with an insulating sheet such as nylon sheet. A pair of spring loaded electrical contacts in the form of ball bearings 142 are provided in the housing 132, and arranged to bear on the insulated face of the disc 141 at such a position that, once every revolution of the output shaft, the contacts are bridged by the uncovered portion of the periphery of the disc 141 thereby to give an electrical signal pulse for every revolution of the output shaft 135'. This electrical output signal is utilised in the control of the clutch and the electric motor in a manner to be discussed below.

Figure 9:
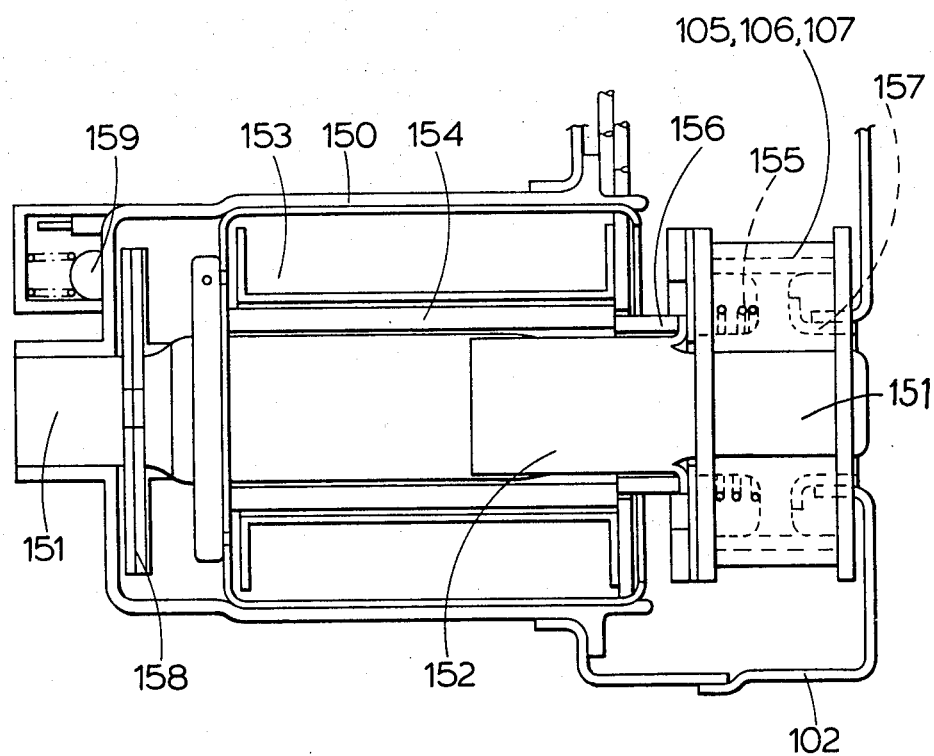
FIG. 9 is a cross-sectional view of a further drive clutch of FIG. 2.

FIG. 9 shows a cross-sectional view of one of the electromagnetic clutches, the 108, 109 and 115 of FIG. 2 all of which are the same. These clutches each comprise housing 150, mounted and located in a bush formed in the transmission housing 102', and having a clutch shaft 151 rotatably mounted therein. The toothed wheels 105', 106' and 107' as the case may be are rotatably carried on one end of the shaft 151 within the housing 102'. The face of the toothed wheel adjacent the clutch is provided with drive dogs arranged to engage dogs on a drive member 152 which is slidably carried on the shaft 151 but driveably connected thereto. An electromagnetic solenoid 153 is provided in the housing 150 to be operative on a sleeve armature 154, so that when the solenoid is energised, the armature 154 moves the drive member 152 to engage the respective toothed wheel and thus driveably couple it to the shaft 151. A spring 155 is interposed between a flange of the toothed wheel and drive member 152 to separate the drive member from the toothed wheel positively when the solenoid is disengaged. A nylon thrust sleeve 156 is interposed between the drive member 152 and the armature 154 to accommodate rotation between these two elements.

The drive shaft 151 is preferably formed as a tubular member being cylindrical over most of its length to form bearing surfaces in the toothed wheel and drive member 152 at one end, and to rotate in the housing at the other end. The shaft 151 is flattened over a centered portion which lies inside the armature 154 so that internal flats are provided to driveably engage the square section of the cross shafts 89', 110 and 116; and so that external flats are provided to driveably engage in slots formed in one end of a sleeve portion of the drive member 152. The toothed wheel is rotatably carried in the housing 102' by means of a bearing bush 157 to complete the bearing support of the shaft 151.

The shaft 151 is provided with a contact disc 158 arranged to provide an electrical pulse signal by means of spring loaded ball bearing contacts 159 carried in the housing 150, in the manner exactly similar as that described with reference to the clutch of FIG. 8 and for a similar purpose.

The respective electric clutches 108, 109, 115 and 117 for the drive to the various adjustments, and the electric motor 100', are preferably operated under the control of an electronic computer such as a microprocessor. In such an arrangement the microprocessor is programmed to supply the necessary electric current to the clutches in the motor through the intermediary of suitable power amplifiers. By this means the processor may adjust the various portions of the seat to various attitudes governed by input signals to the microprocessor in accordance with a programme held in the microprocessor. The microprocessor is provided with suitable storage means for the programme to achieve such adjustments, and the control input to the microprocessor may be by means of a multiposition control switch such as that indicated in FIG. 2 at 130'.

It should be mentioned that the microprocessor is not shown in detail in FIG. 2, but may be embodied in the housing of the switch 130'. The switch 130' shown in FIG. 2 comprises a joystick type switch which is movable in eight generally radial directions about a pivot, as indicated schematically in FIG. 2A, to achieve various movements of the seat supported on the slide. The switch is provided with suitable contacts to give appropriate control signals of the microprocessor so that the processor can operate in accordance with its programme to control the electric motor and the clutches. Rotation of the switch in either direction can provide a further control option. In a preferred arrangement, movement of the switch 130' in a fore and aft direction will result in drive to the lead screws to move the seat fore and aft only. Movement of the switch in a vertical direction up or down will provide drive to all four of the height adjusting devices to raise or lower the seat while maintaining a given rake angle. Moving the switch in an oblique direction up or down with combined fore or aft movement would raise or lower the front or rear of the seat to adjust the rake angle. Lastly rotation of the switch in either direction would produce appropriate adjustment of the seat back.

The control switch housings are also provided with three push buttons which in accordance with the programme of the microprocessor may cause the processor to energise the clutches and the electric motor to move the seat to a pre-stored configuration. For this purpose the microprocessor is also provided with storage means for storing data relating to those chosen positions, which data would be accessed on pressing the appropriate button drive the seat to the chosen position. The microprocessor is provided with data signals representative of the actual position of the various seat slide elements and adjustments so that the processor can compare the actual position of the seat with a demanded position of the seat to produce the appropriate control signals. The provision of these representative data signals is achieved by the electric pulse signals provided by the clutch devices discussed above.

The processor is programmed to count the pulses from each drive to evaluate the actual position of the respective adjustment.

In an alternative arrangement to that discussed with the provision of electromagnetic clutches, it will be appreciated that a separate electric motor may be provided for each drive function, in which case the separate electric motor would be provided with control signals by the microprocessor in a similar fashion.

It will further be appreciated that the electric motor 100 and the various electromagnetic clutches may be supplied with current by a simple switching arrangement, as opposed to through the intermediary of a microprocessor, by a switch operating in an exactly similar fashion to that described with reference to the switch 130' above.

Thus is can be seen that utilizing virtually all of the components of the arrangement of FIG. 1, a motorised version of the seat support may be provided. It will be appreciated that many variations are possible. For instance in the case of a passenger only seat as opposed to a driver seat, some of the adjustments such as height adjustment may be omitted since this is often not so important in a passenger seat. Again where the vehicle seat is used as the front seat in a two-door vehicle, where access to rear seats is required, the seat back can be swung forward by the electric drive on operation of the switch for this purpose. Again an anchorage for seatbelts may be provided in an exactly similar fashion.

Where the seat is arranged to tilt forward to provide access in a two-door vehicle, the forward tilting movement can be arranged by operating a suitable switch or transducer to cause the microprocessor to move the seat forward on its slides after a certain angle of forward movement of the seat back has been completed.

I claim:

1. For a seat having a seat squab portion and a seat back pivotally mounted at the rear of the seat squab portion, a mechanism to effect the adjustment of the angle of the seat back in relation to the seat squab portion, the mechanism including at each side of the seat an arcuate worm gear mounted on the seat back, and a cooperating worm having an axis of rotation, which worm is arcuate as seen in directions perpendicular to the axis of rotation of the worm to embrace the arcuate gear for rotating the arcuate gear, a drive shaft for each worm, which shaft extends towards the front of the seat squab portion from the worm; a common cross-shaft which extends transversely of the seat squab portion, coupling means between the cross-shaft and each drive shaft, and an operating handle adjacent the front of the seat squab portion for driving the cross-shaft and hence for adjusting the angle of the seat back at both sides simultaneously from the single operating handle.

2. A seat as claimed in claim 1 in which the drive shafts and cross-shafts are underneath the seat squab portion.

3. A seat as claimed in claim 2 including an electric motor for driving the common cross-shaft.

4. A seat as claimed in claim 3 which further comprises a fore and aft slide at each side of the vehicle seat, slide adjustment means on each slide, a second cross-shaft connecting the two slide adjustment means, and means enabling the electric motor to drive selectively either cross-shaft.

5. A seat as claimed in claim 1 wherein the squab portion is mounted on one component of a fore and aft slide for enabling the position of the seat to be adjusted.

6. A seat as claimed in claim 1 wherein a gearbox is the connecting means between each drive shaft and the cross-shaft.

7. A seat of the type having a frame, said frame having a seat squab portion and a seat back portion pivotally mounted at the rear of said squab portion, comprising:

a pair of U-shaped brackets, one being rapidly mounted to said squab portion of said frame at each side of said squab portion at the juncture of said squab and back portions, each of said U-shaped brackets having an upwardly, forwardly and rearwardly opening pocket and a closed bottom; an aperture through said bottom adjacent the rear of each of said brackets;

a hyperboidal worm gear disposed in each of said apertures;

a side shaft connected to and mounting each of said worm gears and extending forwardly therefrom to the front of said squab portion, each of said side shafts being cradled in and held against lateral and longitudinal movement by and at the bottom of one of said brackets;

an arcuate gear member received within and pivotally secured to each of said brackets, said arcuate gear members each having teeth engaging the adjacent one of said hyperboidal gear members;

means mounting said seat back portion to each of said arcuate gear members for pivotal movement therewith;

a cross-shaft adjacent the front of said seat squab portion;

a cardan shaft connecting each of said side shafts to said cross-shaft for simultaneously driving said side shafts in unison; and means near the front of said squab portion for rotating said cross-shaft whereby said hyperboidal gears are rotated by said side shafts, and said arcuate gears are pivoted in unison to positively and precisely adjust the angle of said seat back to said seat squab.

* * * * *

UNITED STATES PATENT AND TRADEMARK OFFICE
CERTIFICATE OF CORRECTION

PATENT NO. : 4 470 632
DATED : September 11, 1984
INVENTOR(S) : Frederick W Babbs It is certified that error appears in the above-identified patent and that said Letters Patent is hereby corrected as shown below:

Column 8, line 12:

"to" should be --of--

Column 9, line 65:

"135'" should be --136--

Column 10, line 8:

"135'" should be --136--

Column 11, line 35:

After "button" add --to--

Column 12, line 51:

"rapidly" should be --rigidly--

Signed and Sealed this

Nineteenth Day of March 1985

[SEAL]

Attest:

DONALD J. QUIGG

Attesting Officer     Acting Commissioner of Patents and Trademarks